US012737572B2

(12) United States Patent
Duron et al.

(10) Patent No.: US 12,737,572 B2
(45) Date of Patent: Sep. 15, 2026

(54) SYSTEMS AND METHODS FOR SELECTIVELY LIMITING READ ZONES

(71) Applicant: ZEBRA TECHNOLOGIES CORPORATION, Lincolnshire, IL (US)

(72) Inventors: Mark W. Duron, Mastic, NY (US); Rehan K. Jaffri, Tarrytown, NY (US); Raymond Terry Durham, Summers, AR (US)

(73) Assignee: Zebra Technologies Corporation, Lincolnshire, IL (US)

( * ) Notice: Subject to any disclaimer, the term of this patent is extended or adjusted under 35 U.S.C. 154(b) by 92 days.

(21) Appl. No.: 18/791,329

(22) Filed: Jul. 31, 2024

(65) Prior Publication Data

US 2026/0037756 A1 Feb. 5, 2026

(51) Int. Cl.
*G06K 7/10* (2006.01)

(52) U.S. Cl.
CPC ..... *G06K 7/10356* (2013.01); *G06K 7/10297* (2013.01)

(58) Field of Classification Search
CPC ....................... G06K 7/10356; G06K 7/10297
USPC ................................................ 340/10.1–10.5
See application file for complete search history.

(56) References Cited

U.S. PATENT DOCUMENTS 7,088,248 B2 * 8/2006 Forster ..................... H04K 3/86 340/10.2
7,667,575 B2 * 2/2010 Husak .................. G06K 7/0008 708/250
7,701,351 B2 * 4/2010 Kawai ................ G06K 7/10336 340/572.1
8,174,391 B2 * 5/2012 Sandler .................... H01Q 3/02 343/757
8,643,490 B2 * 2/2014 Rofougaran ....... G06K 19/0724 340/10.3
8,730,044 B2 * 5/2014 Campero ........... G08B 13/2474 340/10.2
9,007,173 B2 * 4/2015 McIntyre ........... G07C 9/00904 343/893
9,158,945 B2 * 10/2015 Duron ................ G06K 7/10475
9,734,368 B1 * 8/2017 Kantor ............... G06K 7/10366
10,013,587 B1 * 7/2018 Pesavento .......... G06K 7/10178
10,235,854 B2 * 3/2019 Trani .................... H04W 4/021
10,860,817 B2 * 12/2020 Trivelpiece ........ G06Q 10/0833
11,955,723 B2 * 4/2024 Pirch ........................ H01Q 5/25
2013/0169414 A1 * 7/2013 Bellows ............. G06K 17/0022 340/10.1

* cited by examiner

*Primary Examiner* — Nam V Nguyen

(57) ABSTRACT

Systems and methods for selectively limiting read zones are disclosed herein. An example method includes synchronizing signal transmissions from a first antenna associated with a first reader and a second antenna associated with a second reader to generate (i) a first read zone corresponding to the first antenna, (ii) a second read zone corresponding to the second antenna, and (iii) a null zone between the first read zone and the second read zone that prevents the first reader and the second reader from reading tags located in the null zone. The example method further includes linking (i) the first reader with a tag located in the first read zone or (ii) the second reader with a tag located in the second read zone based on an energy ratio of a first signal transmitted by the first antenna to a second signal transmitted by the second antenna.

20 Claims, 7 Drawing Sheets

FIG. 1

SYSTEMS AND METHODS FOR SELECTIVELY LIMITING READ ZONES

BACKGROUND

In the field of Radio Frequency Identification (RFID) technology, diversity in antenna design, including variations in size, polarization, and bandwidth, plays a critical role in optimizing a system's performance. Antennas with different physical dimensions and configurations can offer varying bandwidths and polarization characteristics, influencing the system's ability to accurately detect and read RFID tags across different spatial orientations and frequency ranges.

Traditionally, RFID systems utilize multiple, adjacent antennas to cover various zones for RFID tag reading. However, this approach often results in overlapping read patterns, leading to duplicative reads of RFID tags. Such redundancy not only adds to system inefficiency but also contributes to data processing bottlenecks, thereby hampering the overall performance of RFID-based tracking solutions.

One conventional strategy to address the issue of overlapping antenna read patterns involves varying the gain of the antennas. While this technique can mitigate overlaps to some extent, it introduces its own set of challenges, particularly in terms of use case flexibility and power constraints. Further, the RFID tag read accuracy under this conventional approach is often compromised, impacting the reliability of the overall RFID system. Moreover, conventional configurations and synchronization methods have struggled to eliminate false positives and adequately cover critical zones without leaving blind spots, thus failing to meet the evolving demands for precision and efficiency in RFID applications.

Accordingly, a need exists for improved technologies and techniques for managing RFID read zone overlap to ensure optimal system performance.

SUMMARY

In some aspects, the techniques described herein relate to a system including: a first antenna associated with a first reader and disposed at a first angle; a second antenna associated with a second reader and disposed at a second angle different from the first angle; one or more processors; and one or more memories communicatively coupled to the first antenna, the second antenna, and the one or more processors storing instructions that, when executed by the one or more processors, cause the system to: synchronize signal transmissions from the first antenna and signal transmissions from the second antenna to generate (i) a first read zone corresponding to the first antenna, (ii) a second read zone corresponding to the second antenna, and (iii) a null zone between the first read zone and the second read zone that prevents the first reader and the second reader from reading tags located in the null zone, and link (i) the first reader with a tag located in the first read zone or (ii) the second reader with a tag located in the second read zone, based on an energy ratio of a first signal transmitted by the first antenna to a second signal transmitted by the second antenna.

In some aspects, the techniques described herein relate to a system, wherein: the first antenna and the second antenna are disposed adjacent to a surface; and the second angle is greater than approximately 0° between the surface and a first plane that is orthogonal to the surface.

In some aspects, the techniques described herein relate to a system, wherein the second antenna is rotated relative to the first antenna in a second plane that is parallel to the surface.

In some aspects, the techniques described herein relate to a system, wherein: the first antenna is a narrow beamwidth antenna with a first angular coverage area; and the second antenna is a wide beamwidth antenna with a second angular coverage area different from the first angular coverage area.

In some aspects, the techniques described herein relate to a system, wherein the second read zone is bifurcated into two sub-zones.

In some aspects, the techniques described herein relate to a system, wherein: the first read zone is within a gap between a first surface and a second surface; a first sub-zone of the second read zone is adjacent to the first surface; and a second sub-zone of the second read zone is adjacent to the second surface.

In some aspects, the techniques described herein relate to a system, wherein the energy ratio of signals transmitted by the first antenna to signals transmitted by the second antenna and received by tags in the null zone is less than or equal to 4 decibels (dB).

In some aspects, the techniques described herein relate to a system, wherein the first antenna and the second antenna are patch phased array antennas.

In some aspects, the techniques described herein relate to a method including: synchronizing, by one or more processors, signal transmissions from a first antenna associated with a first reader and a second antenna associated with a second reader to generate (i) a first read zone corresponding to the first antenna, (ii) a second read zone corresponding to the second antenna, and (iii) a null zone between the first read zone and the second read zone that prevents the first reader and the second reader from reading tags located in the null zone, the first antenna being disposed at a first angle, and the second antenna being disposed at a second angle different from the first angle; and linking, by the one or more processors, (i) the first reader with a tag located in the first read zone or (ii) the second reader with a tag located in the second read zone based on an energy ratio of a first signal transmitted by the first antenna to a second signal transmitted by the second antenna.

In some aspects, the techniques described herein relate to a method, wherein: the first antenna and the second antenna are disposed adjacent to a surface; and the second angle is greater than approximately 0° between the surface and a first plane that is orthogonal to the surface.

In some aspects, the techniques described herein relate to a method, wherein the second antenna is rotated relative to the first antenna in a second plane that is parallel to the surface.

In some aspects, the techniques described herein relate to a method, wherein: the first antenna is a narrow beamwidth antenna with a first angular coverage area; and the second antenna is a wide beamwidth antenna with a second angular coverage area different from the first angular coverage area.

In some aspects, the techniques described herein relate to a method, wherein the second read zone is bifurcated into two sub-zones.

In some aspects, the techniques described herein relate to a method, wherein: the first read zone is within a gap between a first surface and a second surface; a first sub-zone of the second read zone is adjacent to the first surface; and a second sub-zone of the second read zone is adjacent to the second surface.

In some aspects, the techniques described herein relate to a method, wherein the energy ratio of signals transmitted by the first antenna to signals transmitted by the second antenna and received by tags in the null zone is less than or equal to 4 decibels (dB).

In some aspects, the techniques described herein relate to a method, wherein the first antenna and the second antenna are patch phased array antennas.

In some aspects, the techniques described herein relate to a tangible machine-readable medium including instructions that, when executed, cause a machine to at least: synchronize signal transmissions from a first antenna associated with a first reader and a second antenna associated with a second reader to generate (i) a first read zone corresponding to the first antenna, (ii) a second read zone corresponding to the second antenna, and (iii) a null zone between the first read zone and the second read zone that prevents the first reader or the second reader from reading tags located in the null zone, the first antenna being disposed at a first angle, and the second antenna being disposed at a second angle different from the first angle; and link (i) the first reader with a tag located in the first read zone or (ii) the second reader with a tag located in the second read zone based on an energy ratio of a first signal transmitted by the first antenna to a second signal transmitted by the second antenna.

In some aspects, the techniques described herein relate to a tangible machine-readable medium, wherein: the first antenna and the second antenna are disposed adjacent to a surface; the second angle is greater than approximately 0° between the surface and a first plane that is orthogonal to the surface; and the second antenna is rotated relative to the first antenna in a second plane that is parallel to the surface.

In some aspects, the techniques described herein relate to a tangible machine-readable medium, wherein: the first antenna is a narrow beamwidth antenna with a first angular coverage area; and the second antenna is a wide beamwidth antenna with a second angular coverage area different from the first angular coverage area.

In some aspects, the techniques described herein relate to a tangible machine-readable medium, wherein the energy ratio of signals transmitted by the first antenna to signals transmitted by the second antenna and received by tags in the null zone is less than or equal to 4 decibels (dB).

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 1 depicts an example environment in which systems/methods for selectively limiting read zones may be implemented, in accordance with embodiments described herein.

Figure 2A:
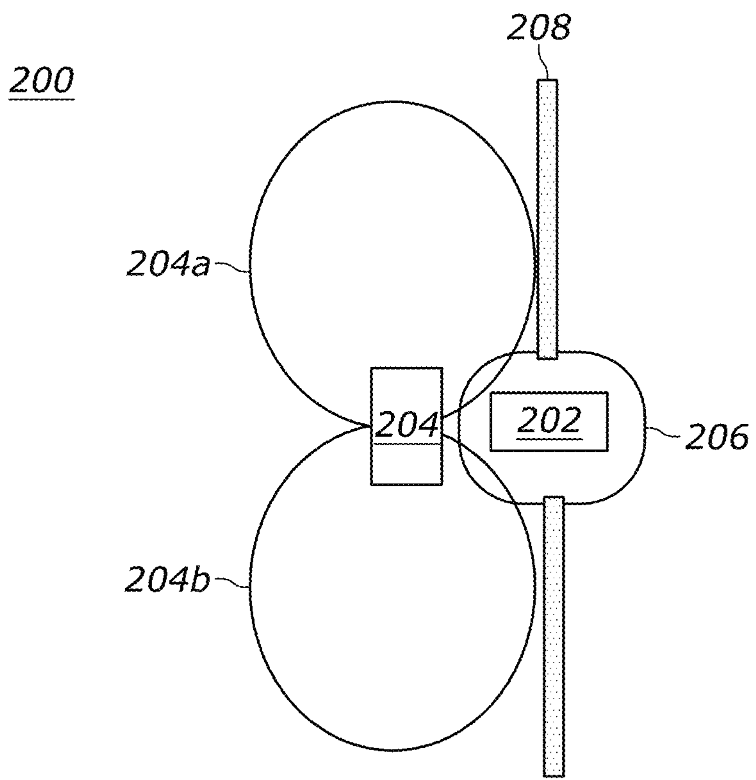
FIG. 2A depicts an example read zone configuration, in accordance with various embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As mentioned, in the realm of RFID technology, reading tags precisely and efficiently is paramount for a myriad of applications, ranging from inventory management to security and access control. However, the deployment of RFID systems, particularly in environments with multiple antennas, has experienced several notable challenges. One of the most significant issues is multipath and the overlapping of antenna read patterns (also referenced herein as "zones"), which can lead to duplicative RFID tag reads. This introduces inefficiencies and data processing bottlenecks which undermine the reliability and speed of RFID-based systems. Moreover, conventional attempts to mitigate this issue by, for example, varying antenna gain and or power are hampered by power constraints and accuracy requirements, which vary significantly based on the use case.

To address these and other challenges, the present systems and methods selectively limit RFID reads by strategically configuring and synchronizing multiple antennas to create distinct read zones and a null zone, thereby enhancing the efficiency and accuracy of RFID tag detection and data processing. One embodiment of the systems and methods described herein utilize a first fixed patch phased array disposed at a first angle to yield a narrow beamwidth antenna and a second fixed patch phased array disposed at a second angle to yield a wide beamwidth antenna based on a common driver printed circuit board (PCB). By employing antennas with different beamwidths and orientations, the present techniques effectively segregate the respective read zones, thereby mitigating the issues associated with overlapping read patterns. In particular, the systems and methods described herein create a null zone between the antenna read zones by synchronizing signal transmissions from the two antennas. This null zone prevents either reader from reading RFID tags located within the null zone, thereby eliminating the problem of duplicative reads and enhancing the system's overall efficiency.

The systems and methods described herein can thus solve various practical problems, including the creation of non-overlapping antenna read zones at facility entry and exit points. Conventional systems, which typically consist of two or more antennas placed near an exit, suffer from false positives and blind spots where a user carrying an item with an RFID tag could slip past the system without the system reading the RFID tag. For example, conventional systems limited antenna operating power to directly limit the read ranges, resulting in fewer RFID tag reads (blind spots) and/or false positive reads (overlapping read zones). By contrast, the systems and methods described herein eliminate the blind spots and false positives experienced by such conventional systems.

Namely, the systems and methods described herein synchronize the antenna signal transmissions, allowing the antennas to be driven at full operating power. This synchronization ensures that no RFID tags within a first reader zone are read by a second reader due to the energy ratio present in the emitted signals. RFID tags generally require a minimal power level discrepancy between any two simultaneously received signals to enable the RFID tag to accurately decode and interpret the instructions from the stronger signal. Thus, by synchronizing the antenna signal transmissions, the systems and methods described herein create a null zone between adjacent read zones, outside of which, only the reader associated with the read zone can read RFID tags. It is therefore possible to drive the antennas at full power without receiving false positives, as each reader is effectively incapable of reading tags outside of their respective read zone.

Overall, the present systems and methods represent a comprehensive solution to the challenges associated with conventional RFID tag reading systems. By leveraging synchronized signal transmissions and strategically oriented antennas with different beamwidths the present systems and methods significantly improve the efficiency, accuracy, and reliability of RFID tag reading. These advancements simultaneously address the technical problems of overlapping read patterns (false positives) and read zone blind spots.

Thus, in accordance with the above, and with the disclosure herein, the present disclosure includes improvements in computer functionality or improvements to other technologies at least because the present disclosure describes that, e.g., RFID systems, and their related various components, may be improved or enhanced with the disclosed selectively limited read zones that provides more accurate locationing/tracking services for RFID tags and corresponding assets. That is, the present disclosure describes improvements in the functioning of an RFID system itself or "any other technology or technical field" (e.g., the field of distributed/industrial locationing systems) because the disclosed selectively limited read zones improves and enhances operation of locationing systems by introducing antenna synchronization and orientations that eliminate/reduce read zone overlap, read zone blind spots, and other inefficiencies typically experienced over time by locationing systems lacking such selectively limited read zones. This improves the state of the art at least because such previous RFID systems are inaccurate as they lack the ability for selectively limiting read zones in the manners described herein.

In addition, the present disclosure includes applying various features and functionality, as described herein, with, or by use of, a particular machine, e.g., a tag, a reader, a server, and/or other hardware components as described herein.

Moreover, the present disclosure includes specific features other than what is well-understood, routine, conventional activity in the field, or adding unconventional steps that demonstrate, in various embodiments, particular useful applications, e.g., synchronizing signal transmissions from a first antenna and signal transmissions from a second antenna to generate (i) a first read zone corresponding to the first antenna, (ii) a second read zone corresponding to the second antenna, and (iii) a null zone between the first read zone and the second read zone that prevents a first reader and a second reader from reading tags located in the null zone, and/or linking (i) the first reader with a tag located in the first read zone or (ii) the second reader with a tag located in the second read zone, based on an energy ratio of a first signal transmitted by the first antenna to a second signal transmitted by the second antenna, among others.

Figure 1:
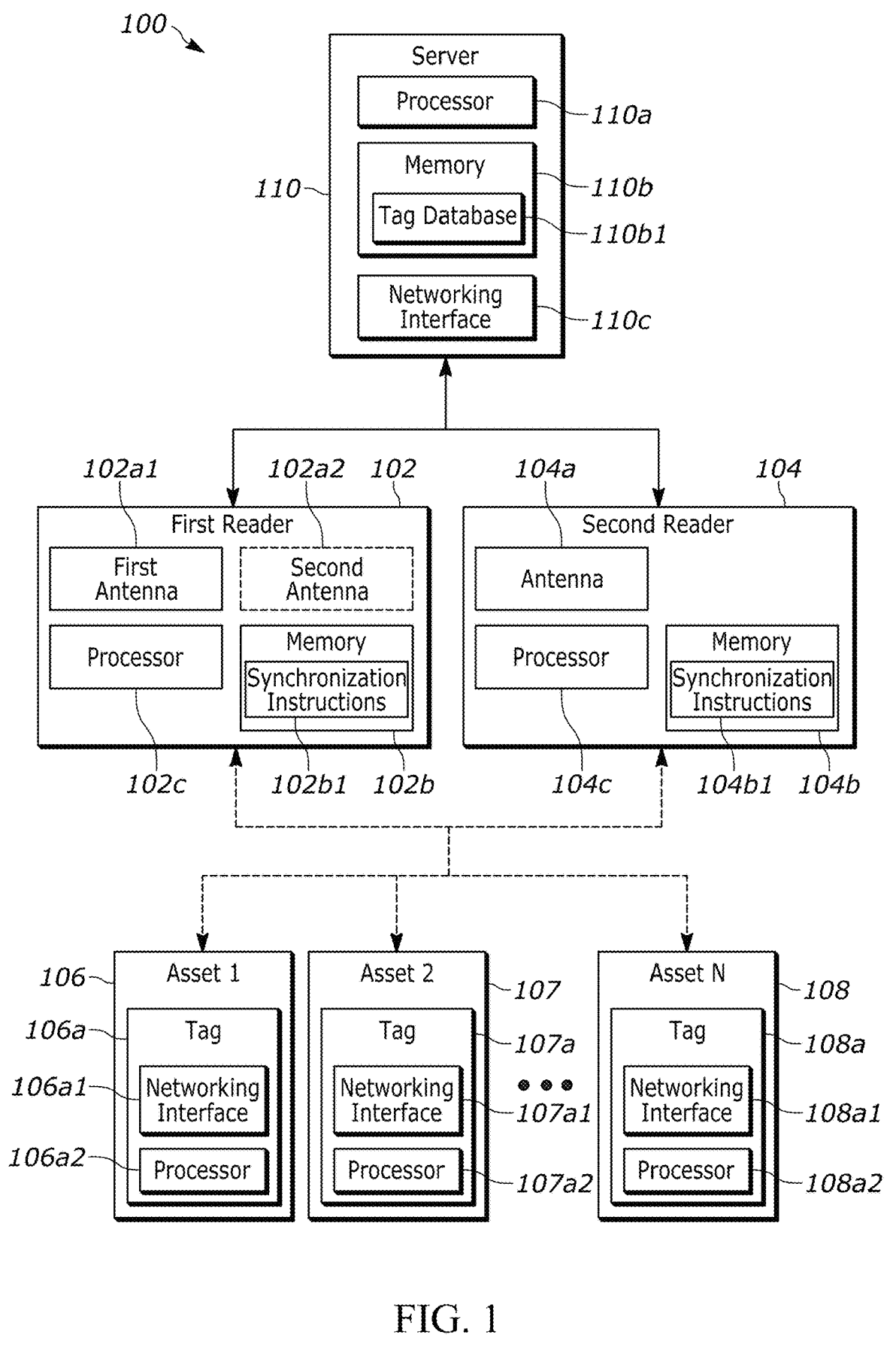

Turning to the figures, FIG. 1 depicts an example environment 100 in which systems/devices for selectively limiting read zones may be implemented, in accordance with embodiments described herein. The example environment 100 may comprise, include, and/or otherwise be a part of a networking environment in which the systems/devices of the present disclosure may operate. In the example embodiment of FIG. 1, the example environment 100 includes a first reader 102 and a second reader 104 that may be communicatively coupled to a first tag 106*a* of a first asset 106, a second tag 107*a* of a second asset 107, a third tag 108*a* of an $N^{th}$ asset 108, and a server 110. Generally, the first reader 102, the second reader 104, the first tag 106*a*, the second tag 107*a*, the third tag 108*a*, and/or the server 110 may be capable of executing instructions to, for example, implement operations of the example methods described herein, as may be represented by the flowcharts of the drawings that accompany this description. Namely, the first reader 102 or the second reader 104 may be connected to the first tag 106*a*, the second tag 107*a*, the third tag 108*a*, and/or the server 110 across multiple communication channels and may generally be configured to receive and process information received from the first tag 106*a*, the second tag 107*a*, the third tag 108*a*, and/or the server 110.

The example environment 100 may be or include any suitable real-world environment, such as a grocery store, loading warehouse, hospital, etc., and the area(s) of interest covered by the first reader 102 and/or the second reader 104 may be or include high travel density asset pathways corresponding to the real-world environment. For example, an area of interest covered by the signal beams of the first reader 102 and/or the second reader 104 may include an entry/exit pathway to/from a grocery store, where the first reader 102 and/or the second reader 104 may track dynamic assets as entities enter/exit the store. As another example, an area of interest may be individual loading docks, storage areas, movement pathways for equipment/machinery, etc. within a warehouse.

In any event, the first reader 102 has a first antenna 102*a*1, an optional second antenna 102*a*2 one or more memories 102*b* storing a set of sequence instructions 102*b*1, and one or more processors 102*c*. The second reader 104 has an antenna 104*a*, one or more memories 104*b* storing a set of sequence instructions 104*b*1, and one or more processors 104*c*. The first reader 102 and the second reader 104 are generally configured to transmit and receive data to/from the server 110 and nearby tags (e.g., the first tag 106*a*, the second tag 107*a*, the third tag 108*a*). In certain embodiments, the first reader 102 and/or the second reader 104 may be an ultra-high frequency (UHF) RFID reader device that communicates with some/all of the devices in the environment 100 via UHF radio signals. In some embodiments, the first reader 102 and/or the second reader 104 may be a device that executes and/or conforms to any suitable software operating system (e.g., Android, iOS), a custom Internet of Things (IoT) bridge device with a UHF radio, and/or any other suitable device or combination thereof.

Namely, the first reader 102 and/or the second reader 104 are generally configured to periodically listen for data packets from nearby tags (e.g., tags 106*a*, 107*a*, 108*a*), transmit the data packets and/or data obtained therein to the server 110, and/or broadcast requests received from the server 110 to such nearby tags. As an example, the first reader 102 and/or the second reader 104 may receive requests from the server 110, and may subsequently transmit requests to proximate tags 106*a*, 107*a*, 108*a* based on the requests. Such requests from the server 110 may be or include instructions causing the tags 106*a*, 107*a*, 108*a* to transmit identification data to the first reader 102 and/or the second reader 104 and/or other suitable instructions or combinations thereof.

However, as discussed herein, the first reader 102 and the second reader 104 may emit synchronized signals, such that the readers 102, 104 are only able to connect to (read) the tags 106*a*, 107*a*, 108*a* when the tags are within their respective read zones. In particular, the first reader 102 and the second reader 104 include synchronization instructions 102*b*1, 104*b*1 that, when executed, may cause the readers 102, 104 to emit synchronized signals for receipt by the tags 106*a*, 107*a*,108*a*. When the tags 106*a*, 107*a*, 108*a* receive these synchronized signals, the tags 106*a*, 107*a*, 108*a* may only decode/execute the instructions included in the signal that satisfies an energy ratio (e.g., multiple decibels (dB) stronger than the other received signal(s)).

For example, the first tag 106*a* may be located within the first reader's 102 read zone, as defined by a portion of the coverage areas of the first antenna 102*a*1 and/or the second antenna 102*a*2, and the second tag 107*a* may be located within the second reader's 104 read zone, as defined by a portion of the coverage area of the antenna 104*a*. The first reader 102 and the second reader 104 may emit signals to connect with the first tag 106*a* and the second tag 107*a* in accordance with the synchronization instructions 102*b*1, 104*b*1, such that the first reader 102 and the second reader 104 emit synchronized signals to the first tag 106*a* and the second tag 107*a*. The first tag 106*a* may receive the signals from the first reader 102 and the second reader 104 simultaneously and may only decode/execute the instructions included in the first reader 102 signal because that signal is significantly stronger than the signal from the second reader 104 within the first reader's 102 read zone. Similarly, the second tag 107*a* may receive the signals from the first reader 102 and the second reader 104 simultaneously and may only decode/execute the instructions included in the second reader 104 signal because that signal is significantly stronger than the signal from the first reader 102 within the second reader's 104 read zone.

As referenced herein, a "coverage area" may refer to the complete geometrical area where an antenna is able to transmit/receive signals to/from an RFID tag, notwithstanding the techniques described herein. By contrast, a "read zone" associated with an antenna refers to a portion of the antenna's coverage area where the antenna is able to transmit/receive signals to/from an RFID tag when the antenna transmits signals that are synchronized with signal transmissions from other adjacent/proximate antennas/readers, in accordance with the various techniques described herein. Thus, a tag may be located within an antenna's coverage area without being located within the antenna's read zone.

In certain embodiments, the first reader 102 may further delineate tag positions by individual antenna 102*a*1, 102*a*2 read zones. The first antenna 102*a*1 may have a first read zone and the second antenna 102*a*2 may have a second read zone that does not overlap with the first read zone. These different read zones may be predetermined and stored in the memory 102*b* and/or the memory 110*b*, such that the first reader 102 can distinguish between, and thereby more accurately locate, tags read by the first antenna 102*a*1 or the second antenna 102*a*2. Accordingly, the first reader 102 may execute the synchronization instructions 102*b*1 to transmit synchronized signals by the first antenna 102*a*1 and the second antenna 102*a*2, receive responses from one or more tags 106*a*, 107*a*, 108*a*, and determine the specific location of each tag based on the antenna 102*a*1, 102*a*2 that received the response.

In any event, the first antenna 102*a*1, the second antenna 102*a*2, and the antenna 104*a* may be generally configured to transmit/receive data streams to/from various devices of the example environment 100, such as the server 110 and/or the tags 106*a*, 107*a*, 108*a*. The first antenna 102*a*1, the second antenna 102*a*2, and the antenna 104*a* may each have an associated gain profile corresponding to converting input power into radio waves (e.g., transmission) and/or received radio waves into electrical power (e.g., receiving). For example, the first antenna 102*a*1, the second antenna 102*a*2, and/or the antenna 104*a* may be a phased-array antenna configured to transmit and receive signal beams in various directions. In certain embodiments, the first reader 102 and/or the second reader 104 may also communicate with the server 110 via any suitable network and corresponding network interface (not shown).

In certain embodiments, the first antenna 102*a*1, the second antenna 102*a*2, and/or the antenna 104*a* may be oriented and/or otherwise configured to have a specific angular coverage area (e.g., beamwidth). For example, the first antenna 102*a*1 may be oriented at zero degrees relative to a surface to which the first reader 102 is affixed, resulting in the first antenna 102*a*1 being a narrow beamwidth antenna with a first angular coverage area of approximately 24° in angular width. In this example, the antenna 104*a* may be oriented at approximately 45° degrees relative to a surface to which the second reader 104 is affixed, resulting in the antenna 104*a* being a wide beamwidth antenna with a second angular coverage area of approximately 110° in angular width. However, the various antennas 102*a*1, 102*a*2, 104*a* may have any suitable orientations, polarizations, and/or any other characteristics or combinations thereof to suit the specific use-case and desired read zone geometries.

The sets of synchronization instructions 102*b*1, 104*b*1 generally include instructions to time/synchronize antenna transmissions via any of the antennas 102*a*1, 102*a*2, 104*a*. Further, in some embodiments, the first reader 102 and/or the second reader 104 may include three antennas, four antennas, five antennas, and/or any suitable number of antennas, such that the sets of synchronization instructions 102*b*1, 104*b*1 may cause the first reader 102 and/or the second reader 104 to synchronize transmissions between/among any suitable number of antennas.

The server 110 includes one or more processors 110*a*, one or more memories 110*b* storing a tag database 110*b*1, and a networking interface 110*c*. The tag database 110*b*1 may be or include a listing of tags (e.g., tag 106*a*, tag 107*a*, tag 108*a*) that are proximate to specific readers (e.g., first reader 102, second reader 104) and/or otherwise transmit data to/from the particular reader(s). More specifically, the tag database 110*b*1 listings may include identification information about each of the tags 106*a*, 107*a*, 108*a* and/or the assets 106, 107, 108 associated with the tags 106*a*, 107*a*, 108*a*, as well as location information determined by the first reader 102 and/or the second reader 104. The tag database 110*b*1 may include any suitable information related to the tags and/or the assets associated with the tags.

To update the tag database **110*b*1, the first reader 102 and/or the second reader 104 may periodically request and/or otherwise receive updates from various tags (e.g., tag 106*a*, tag 107*a*, tag 108*a*) disposed around an environment (e.g., example environment 100), using the first antenna 102*a*1, the second antenna 102*a*2, and/or the antenna 104*a*. Based on the signals received by the first antenna 102*a*1, the second antenna 102*a*2, and/or the antenna 104*a*, the first reader 102 and/or the second reader 104 may determine (via the one or more processors 102*c*, 104*c*) one or more tags indicated in the received data. The first reader 102 and/or the second reader 104 may then update the tag listing for each tag 106*a*, 107*a*, 108*a* by inputting the data received from the respective tags 106*a*, 107*a*, 108*a* into the corresponding tag listing of the tag database 110*b*1. For example, the tag database 110*b*1 may indicate at a first time that the first reader 102 received data from the first tag 106*a* and the second tag 107*a* via the first antenna 102*a*1. At a second time, the second reader 104 may transmit a request to and/or may otherwise receive an update from proximate tags indicating that the second reader 104 received/captured data from the first tag 106*a* and the second tag 107*a* via the antenna 104*a*. Thus, the entries of the tag database 110*b*1 may indicate that the first asset 106 and the second asset 107 moved out of a read zone of the first reader 102 (e.g., collective read zones of the first antenna 102*a*1 and the second antenna 102*a*2) and into a receptive proximity of the second reader 104 (e.g., read zone of antenna 104*a*) at some point between the first time and the second time, such that the first reader 102 was unable to receive data transmitted from the first tag 106*a* and the second tag 107*a* at the second time and the second reader 104 was able to receive the data transmitted from the first tag 106*a* and the second tag 107*a*** at the second time.

The assets 106, 107, 108 may generally be any device, component, or object that an entity may desire to track and/or otherwise locate. For example, the assets 106, 107, 108 may be large and calibrated tools used in and/or for oil and gas equipment/operations, parcels for delivery by a shipping company, hospital equipment that is and/or may be moved to different floors/rooms, wristbands attached to hospital patients, and/or any other suitable objects or combinations thereof. While illustrated as three assets 106, 107, 108, it should be appreciated that the first reader 102 and/or the second reader 104 may simultaneously communicate with any suitable number of assets 106, 107, 108 via the associated tags **106*a*, 107*a*, 108*a*. Thus, the $N^{th}$ asset 108** may be a third asset, a fifth asset, a twentieth asset, a one-hundredth asset, and/or any other integer value asset.

Each asset 106, 107, 108 may also include a corresponding tag **106*a*, 107*a*, 108*a* that may be configured to respond to polling requests by transmitting information associated with the asset via the networking interface 106*a*1, 107*a*1, 108*a*1 to, for example, the first reader 102 and/or the second reader 104. Each asset tag 106*a*, 107*a*, 108*a* may also include one or more processors 106*a*2, 107*a*2, 108*a*2 configured to interpret and/or execute such polling requests and/or other instructions contained in signals received from the first reader 102, the second reader 104, the server 110, and/or other suitable device(s). For example, the processors 106*a*2, 107*a*2, 108*a*2 may be configured to interpret polling requests and/or other signals received from the first reader 102 and/or the second reader 104 and thereby transmit data packets to the first reader 102 and/or the second reader 104**.

Moreover, in certain embodiments, a workstation (not shown) may be communicatively connected to the server 110, and a user/operator may access the server 110 to retrieve a location associated with an asset 106, 107, 108. The workstation may query the server 110 with the identification tag of the corresponding asset 106, 107, 108, and the server 110 may match the identification tag with a location entry in the tag database **110*b*1 associated with the corresponding asset 106, 107, 108. The server 110** may then forward the location entry to the workstation for viewing by the user/operator.

More generally, the one or more memories **102*b*, 110*b* may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., set of synchronization instructions 102*b*1, 104*b*1, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 102*c*, 104*c*, 110*a* (e.g., working in connection with a respective operating system in the one or more memories 102*b*, 104*b*, 110*b***) to facilitate, implement, or perform the machine readable instructions, methods, processes, elements or limitations, as illustrated, depicted, or described for the various flowcharts, illustrations, diagrams, figures, and/or other disclosure herein.

In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.). Moreover, the one or more memories **102*b*, 104*b*, 110*b*** may also store machine readable instructions, including any of one or more application(s), one or more software component(s), and/or one or more APIs, which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein.

The one or more processors **102*c*, 104*c*, 110*a* may be connected to the one or more memories 102*b*, 104*b*, 110*b* via a computer bus (not shown) responsible for transmitting electronic data, data packets, or otherwise electronic signals to and from the one or more processors 102*c*, 104*c*, 110*a* and one or more memories 102*b*, 104*b*, 110*b*** to implement or perform the machine readable instructions, methods, processes, elements or limitations, as illustrated, depicted, or described for the various flowcharts, illustrations, diagrams, figures, and/or other disclosure herein.

The one or more processors **102*c*, 104*c*, 110*a* may interface with the one or more memories 102*b*, 104*b*, 110*b* via the computer bus to execute any suitable application or executable instructions (e.g., set of synchronization instructions 102*b*1, 104*b*1) necessary to perform any of the actions associated with the methods of the present disclosure. The one or more processors 102*c*, 104*c*, 110*a* may also interface with the one or more memories 102*b*, 104*b*, 110*b* via the computer bus to create, read, update, delete, or otherwise access or interact with the data stored in the one or more memories 102***b*, 104*b*, 110*b* and/or external databases (e.g., a relational database, such as Oracle, DB2, MySQL, or a NoSQL based database, such as MongoDB). The data stored in the one or more memories 102*b*, 104*b*, 110*b* and/or an external database may include all or part of any of the data or information described herein, including, for example, asset tag 106*a*, 107*a*, 108*a* data packets, asset location data, synchronization instructions, pseudorandom channel sequences, antenna usage values, and/or other suitable information or combinations thereof.

The networking interfaces 106*a*1, 107*a*1, 108*a*1, 110*c* and/or the antennas 102*a*1, 102*a*2, 104*a* may be configured to communicate (e.g., send and receive) data via one or more external/network port(s) to one or more networks or local terminals, as described herein. In some embodiments, the server 110, the first reader 102, and/or the second reader 104 may include a client-server platform technology such as ASP.NET, Java J2EE, Ruby on Rails, Node.js, a web service or online API, responsive for receiving and responding to electronic requests. The server 110, the first reader 102, and/or the second reader 104 may accordingly implement the client-server platform technology that may interact, via the computer bus, with the one or more memories 102*b*, 104*b*, 110*b* (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 106*a*1, 107*a*1, 108*a*1, 110*c* and/or the antennas 102*a*1, 102*a*2, 104*a* may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a network. In some embodiments, the network (not shown) may comprise a private network or local area network (LAN). Additionally, or alternatively, the network may comprise a public network such as the Internet. In some embodiments, the network may comprise routers, wireless switches, or other such wireless connection points communicating to the server 110 (via networking interface 110*c*) via wireless communications based on any one or more of various wireless standards, including by non-limiting example, an RFID standard, a BLUETOOTH standard (e.g., BLE), IEEE 802.11a/b/c/g (WIFI), or the like.

Figure 2B:
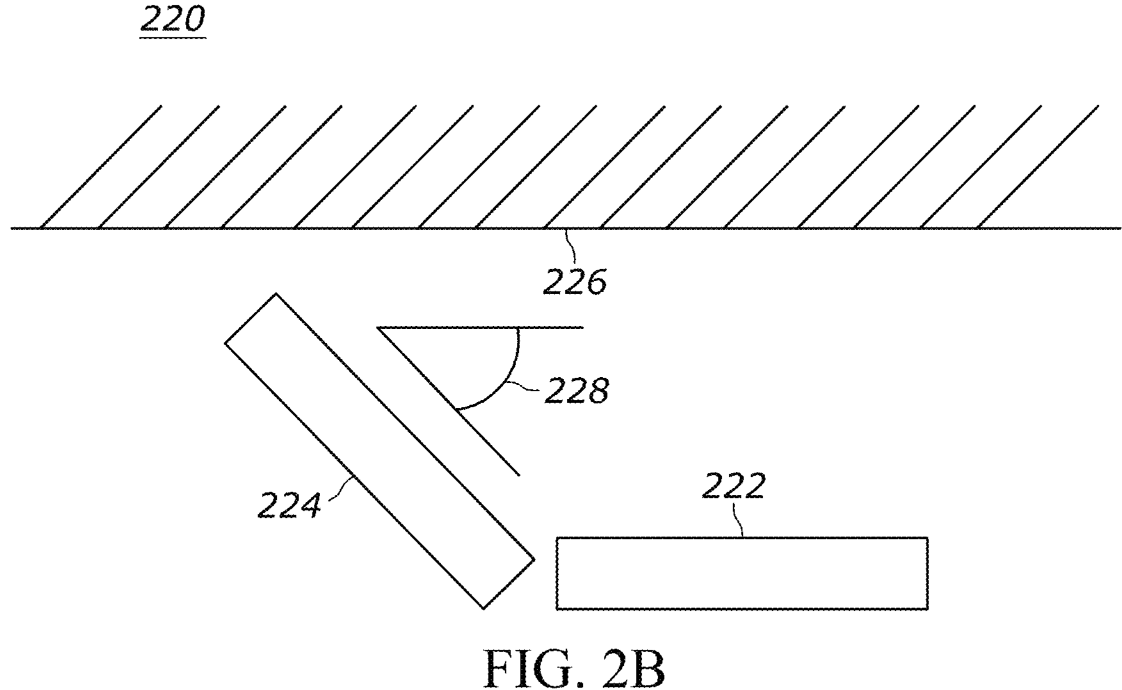
FIG. 2B depicts an example antenna configuration for selectively limiting read zones, in accordance with various embodiments described herein.

To illustrate several reader/antenna configurations/orientations that yield read zones of interest, FIGS. 2A and 2B depict example read zone and antenna configurations, in accordance with various embodiments described herein. For example, FIG. 2A depicts an example read zone configuration 200 where a first reader 202 including an antenna (not shown) has a corresponding read zone 206 and a second reader 204 including an antenna (now shown) has a corresponding read zone comprised of a first zone portion 204*a* and a second zone portion 204*b*.

Practically speaking, the example read zone configuration 200 may represent an entry/exit point for a retail location and/or any other suitable location where assets with corresponding RFID tag may pass. Namely, the gap between the two wall portions 208 may represent the entry/exit point, such that the first reader 202 and the corresponding read zone 206 are positioned directly over the entry/exit point. The second reader 204 and the corresponding read zone 204*a*, 204*b* are positioned inside of the entry/exit point. In particular, the read zone 204*a*, 204*b* of the second reader 204 is bifurcated in a manner such that the read zone 204*a*, 204*b* effectively surrounds the interior (e.g., inside the retail location) portion of the read zone 206. In this manner, the read zone 204*a*, 204*b* closely conforms to the interior surfaces of the wall portions 208 without substantially overlapping with the read zone 206, and thereby significantly reduces the possibility of an asset reaching and passing through the entry/exit point without being identified by the first reader 202 and/or the second reader 204.

The bifurcated shape of the read zone 204*a*, 204*b* is the result of a specific orientation of the second reader 204 antenna. In particular, the second reader 204 antenna is oriented at a non-zero angle relative to the surface (e.g., ceiling) on which the second reader 204 and/or the first reader 202 are disposed, whereas the first reader 202 antenna may be oriented at approximately zero degrees (i.e., parallel) relative to the surface on which the first reader 202 and/or the second reader 204 are disposed. Of course, it should be appreciated that the antenna(s) of the first reader 202 and/or the second reader 204 may be oriented at any suitable angles to suit a specific use-case and/or otherwise achieve any suitable zone read patterns/overlaps.

To better understand the antenna orientations described above, FIG. 2B depicts an example antenna configuration 220 for selectively limiting read zones, in accordance with various embodiments described herein. This example antenna configuration 220 may generally represent the configurations of the antennas included in the first reader 202 and the second reader 204 of FIG. 2A. Specifically, the first antenna 222 may correspond to an antenna of the first reader 202 having a read zone similar to the read zone 206, and the second antenna 224 may correspond to an antenna of the second reader 204 having a read zone similar to the read zone 204*a*, 204*b*.

In this example antenna configuration 220, the first antenna 222 and the second antenna 224 are shown disposed proximate to a surface 226 where the readers (e.g., first reader 202, second reader 204) associated with the respective antennas 222, 224 may be attached. As an example, the surface 226 may be a retail location ceiling near the retail location entry/exit point, and the example antenna configuration 220 is a side view of the ceiling surface 226, the first antenna 222, and the second antenna 222.

As illustrated in FIG. 2B, the first antenna 222 is disposed at a first angle (not shown) of approximately zero degrees (e.g., parallel) relative to the surface 226. The second antenna 222 is disposed at a second angle 228 that is non-zero relative to the surface 226. In certain embodiments, the second angle 228 is approximately 45°. This angular rotation is in a first orthogonal plane to the surface 226 (e.g., along a pitch axis), however it should be appreciated that, to achieve read zones with specific dimensions and/or orientations, the second antenna 224 may be rotated relative to the first antenna 222 in any requisite dimension/plane. For example, in addition to and/or alternatively to the rotation illustrated by the second angle 228, the second antenna 224 may be rotated relative to the first antenna 222 in a plane that is parallel to the surface 226 (e.g., along a yaw axis), in a second orthogonal plane to the surface 226 (e.g., along a roll axis), and/or any combinations thereof.

Figure 2C:
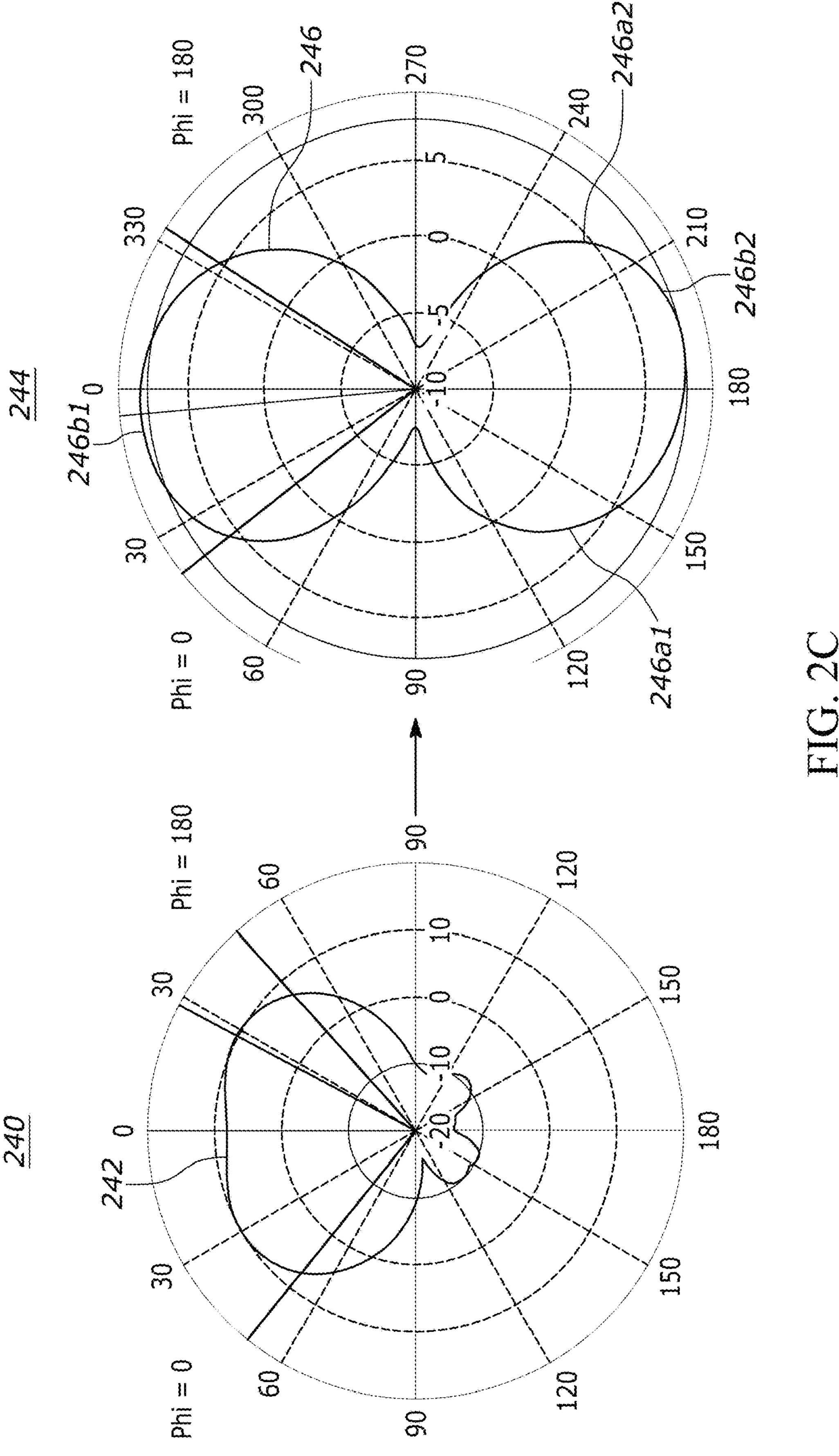
FIG. 2C depicts an example wide-beam antenna read zone profile, in accordance with various embodiments described herein.
Figure 2D:
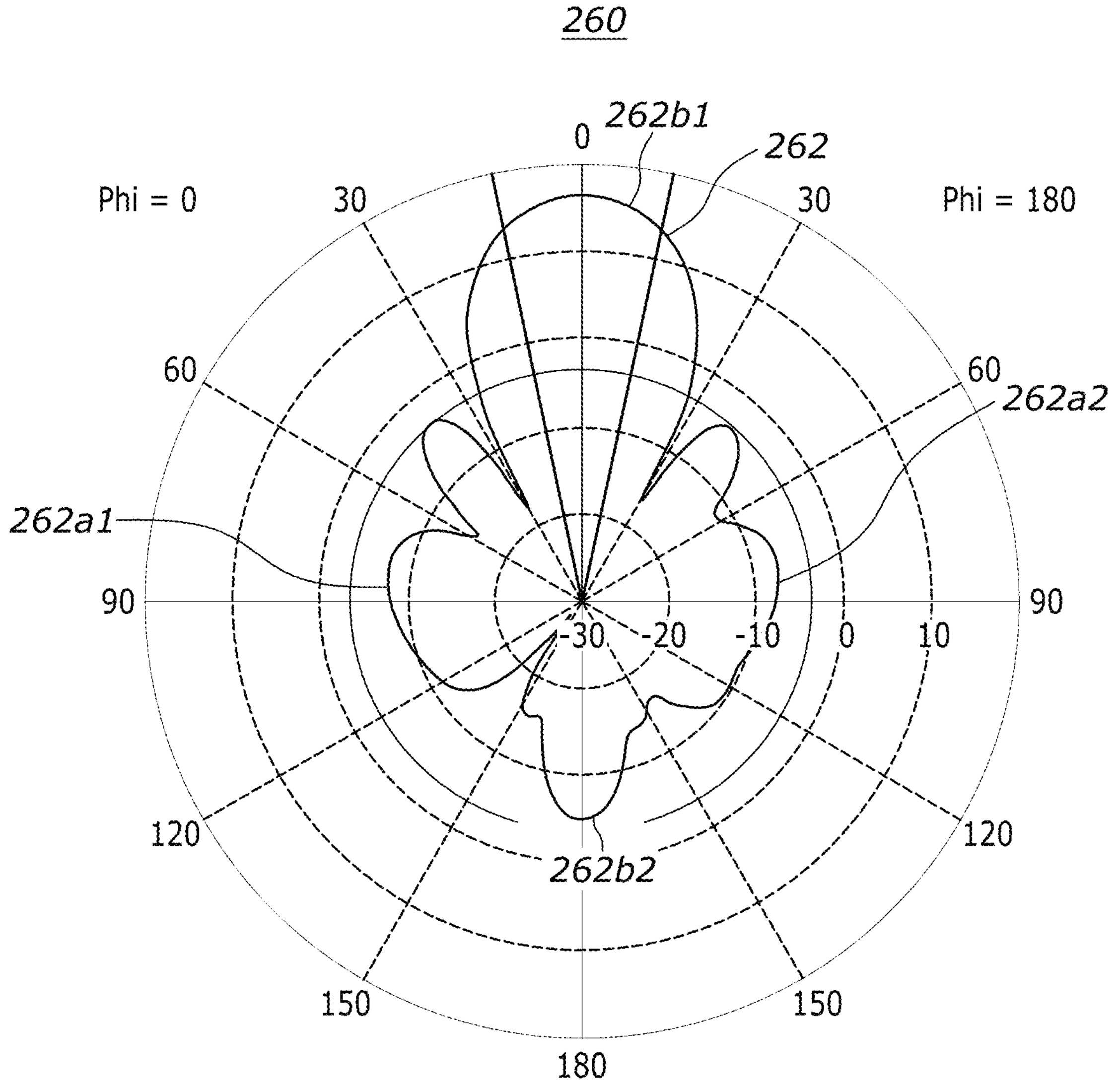
FIG. 2D depicts an example narrow-beam antenna read zone profile, in accordance with various embodiments described herein.

The effects of such rotations on the read zones of the antennas are more clearly illustrated in FIGS. 2C and 2D. FIG. 2C depicts an example wide-beam antenna read zone profile, in accordance with various embodiments described herein. Generally, the example wide-beam antenna read zone profile includes a first wide-beam antenna read zone profile plot 240 and a second wide-beam antenna read zone profile plot 244, both of which include read zones 242, 246. The second read zone 246 may generally represent and/or otherwise correspond to the read zone 204*a*, 204*b* illustrated in FIG. 2A.

The first wide-beam antenna read zone profile plot 240 includes the first wide-beam antenna read zone profile 242, which may correspond to the read zone associated with the second antenna 224 of FIG. 2B before the antenna 224 is rotated by the second angle 228. The first wide-beam antenna read zone profile 242 includes a main lobe magnitude of approximately 10.2 dB and a main lobe direction of approximately 28°. Further, the first wide-beam antenna read zone profile 242 has an angular width of approximately 99.4° at 3 dB, and a side lobe level of approximately −20 dB. Thus, the first wide-beam antenna read zone profile 242 may satisfy the read zone requirements of many use-cases but does not have the requisite shape illustrated in FIG. 2A.

To achieve this bifurcated shape, the antenna is rotated (e.g., by second angle 228). In doing so, the read zone profile of the antenna changes from the first wide-beam antenna read zone profile 242 to the second wide-beam antenna read zone profile 246 illustrated in the second wide-beam antenna read zone profile plot 244. The second wide-beam antenna read zone profile 246 includes a main lobe magnitude of approximately 8.66 dB and a main lobe direction of approximately 5°. Further, the second wide-beam antenna read zone profile 246 has an angular width of approximately 68.6° at 3 dB, and a side lobe level of approximately −0.5 dB. Thus, after rotating the antenna (e.g., by the second angle 228) the wide-beam antenna read zone profile may satisfy the read zone requirements of the specific use-case illustrated in FIG. 2A.

In certain embodiments, this second wide-beam antenna zone profile 246 may have an angular coverage area of approximately 35° by approximately 110°. The 35° measurement generally corresponds to the angular width between a first read zone point 246*a*1 and a second read zone point 246*a*2, and the 110° measurement generally corresponds to the angular width between a first read zone point 246*b*1 and a second read zone point 246*b*2.

By rotating the antenna, the antenna's read zone profile becomes bifurcated in a manner that can create a tightly conforming pair (or set) of adjacent read zones with the first antenna's 202 read zone 206, as depicted in FIG. 2A. The first antenna's 202 read zone 206 is more clearly illustrated in FIG. 2D, which depicts an example narrow-beam antenna read zone profile, in accordance with various embodiments described herein. Generally, the example narrow-beam antenna read zone profile includes a narrow-beam antenna read zone profile plot 260 including a read zone 262. The read zone 262 may generally represent and/or otherwise correspond to the read zone 206*a* illustrated in FIG. 2A.

Specifically, the narrow-beam antenna read zone profile 262 may correspond to the read zone associated with the first antenna 222 of FIG. 2B that is relatively parallel to the surface 226. The narrow-beam antenna read zone profile 262 includes a main lobe magnitude of approximately 16.3 dB and a main lobe direction of approximately 0.0°. Further, the narrow-beam antenna read zone profile 262 has an angular width of approximately 24.1° at 3 dB, and a side lobe level of approximately −19.8 dB. Thus, the narrow-beam antenna read zone profile 262 may satisfy the read zone requirements of the use-case illustrated in FIG. 2A by having an angular width sufficient to cover the entire entry/exit portal of the retail location while simultaneously nestling with the bifurcated read zone of the wide-beam antenna (e.g., second wide-beam antenna zone profile 246).

In certain embodiments, this narrow-beam antenna zone profile 262 may have an angular coverage area of approximately 25° by approximately 35°. The 25° measurement generally corresponds to an angular width between a first read zone point 262*a*1 and a second read zone point 262*a*2, and the 350 measurement generally corresponds to the angular width between a first read zone point 262*b*1 and a second read zone point 262*b*2.

It should be appreciated that the parameters of the read zone profiles described herein are for the purposes of discussion only. For example, the angular coverage areas, main lobe magnitudes, main lobe directions, angular widths, and side lobe levels described in reference to FIGS. 2C and 2D are exemplary, and not intended to be limiting. Further, the read zones described herein in reference to FIGS. 2A-2D may represent read zones resulting from physical reader/antenna configuration/orientation without considering the effects of signal synchronization, as discussed herein in reference to FIGS. 3A and 3B. Thus, the read zones illustrated in FIGS. 2A-2D are for the purposes of discussion only, and such read zones may have slightly different shapes in practice to account for the null zones created by the techniques described herein in reference to FIGS. 3A and 3B.

Figure 3A:
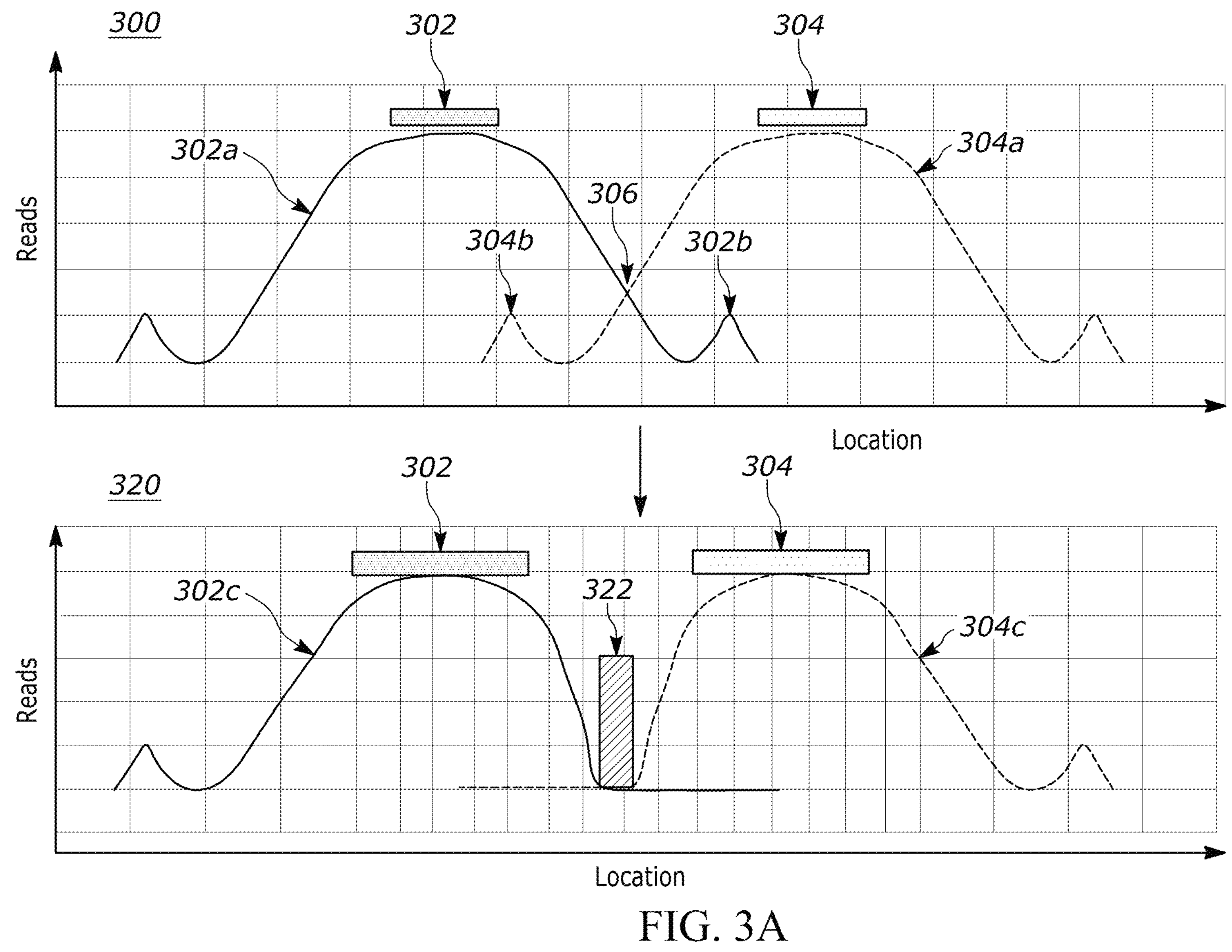
FIG. 3A depicts an example null zone creation, in accordance with various embodiments described herein.

In any event, and as previously mentioned, the coverage areas associated with adjacent antennas often overlap or become coupled together via multipath effects, which can cause misreads in conventional systems. To overcome these challenges and create distinct read zones, the systems and methods of the present techniques synchronize signal transmissions from adjacent readers/antennas and thereby create a null zone preventing such misreads. FIG. 3A depicts an example null zone creation, in accordance with various embodiments described herein.

As illustrated in FIG. 3A, a first reader range plot 300 depicts a typical coverage area overlap between a first antenna 302 (e.g., of a first reader) and a second antenna 304 (e.g., of a second reader). The first antenna 302 has a first coverage area 302*a* with a multipath peak 302*b* near the edge of the first coverage area 302*a*. The second antenna 304 has a second coverage area 304*a* with a multipath peak 304*b* near the edge of the second coverage area 304*a*.

In this first reader range plot 300, the first coverage area 302*a* and the second coverage area 304*a* overlap at an overlap point 306. This overlap point 306 represents an area where RFID tags misreads may occur. In particular, when the signal transmissions from the first antenna 302 are not synchronized with signal transmissions from the second antenna 304, the antennas 302, 304 may transmit signals asynchronously, resulting in RFID tags receiving erroneous (e.g., scattered, multipath peaking) signals from physically distant readers without receiving a signal from the more proximate reader/antenna to prevent the RFID tag from decoding and executing instructions from the physically distant reader. Referring to FIG. 3A, when RFID tags are located within the overlap point 306 or the adjacent multipath peak 302*b*, 304*b* regions located near the overlap point 306 the RFID tags may decode and execute instructions to link with a reader that is significantly further from the RFID tag than the other reader, leading to misreads and erroneously locating the RFID tag and the corresponding asset.

For example, an RFID tag may be located within the area covered by the multipath peak 302*b* of the first antenna 302. Normally, the RFID tag would receive relatively strong signal transmissions from the second antenna 304 and decode/execute the instructions therein to link with and thereby communicate with the second antenna 304. However, if the RFID tag receives a relatively weak (but still above the requisite energy level) signal from the first antenna 302 as a result of the multipath peak 302*b* and does not receive a signal from the second antenna 304 within a certain period of time after receiving the multipath peak 302*b* signal (e.g., within several milliseconds), the RFID tag may erroneously decode/execute instructions to link and communicate with the first antenna 302, despite being significantly closer to the second antenna 304.

To prevent these erroneous RFID tag reads, the systems and methods described herein synchronize transmissions from the first antenna 302 and the second antenna 304, resulting in read zones illustrated by the second reader range plot 320. The second reader range plot 320 includes the first antenna 302 with a read zone 302*c* and a second antenna 304 with a read zone 304*c*. The read zone 302*c* is similar to the coverage area 302*a*, except that the read range of the read zone 302*c* is less than the read range of the coverage area 302*a* near the read zone 304*c* due to the signal transmission synchronization of the first antenna 302 and the second antenna 304. Similarly, the read zone 304*c* is similar to the coverage area 304*a*, except that the read range of the read zone 304*c* is less than the read range of the coverage area 304*a* near the read zone 302*c* due to the signal transmission synchronization of the first antenna 302 and the second antenna 304.

Namely, synchronizing the signal transmissions of the first antenna 302 and the second antenna 304 creates a null zone 322 where neither the first antenna 302 nor the second antenna 304 may read (e.g., link/communicate with) RFID tags. Further, as illustrated in FIG. 3A, the synchronization eliminates erroneous reads due to multipath peaks 302*b*, 304*b*, as the relatively weaker signals from a physically distant antenna/reader will always be received by an RFID tag essentially simultaneously with a significantly stronger signal from a physically proximate antenna/reader.

Figure 3B:
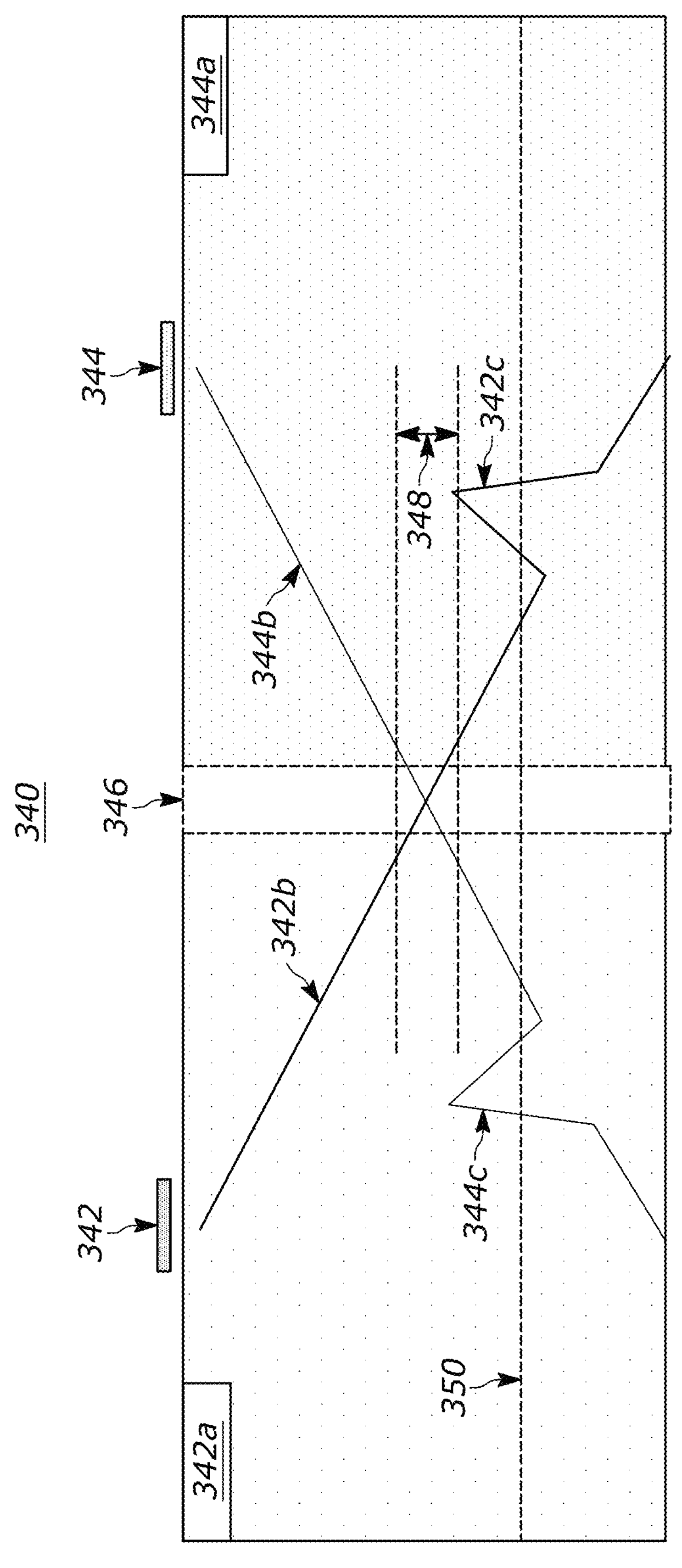
FIG. 3B illustrates the signal energy ratio corresponding to the null zone of FIG. 3A, in accordance with various embodiments described herein.

To illustrate the effects of signal synchronization more clearly, FIG. 3B illustrates a signal energy ratio corresponding to the null zone 322 of FIG. 3A, in accordance with various embodiments described herein. The example null zone configuration 340 of FIG. 3B includes a first antenna 342 and a second antenna 344, each having a read zone 342*a*, 344*a*, a coverage area portion 342*b*, 344*b* and a multipath peak 342*c*, 344*c*. As illustrated in FIG. 3B, the respective coverage area portions 342*b*, 344*b* extend into the read zones 342*a*, 344*a* of the adjacent antennas 342, 344. However, the sections of the coverage area portions 342*b*, 344*b* in the adjacent read zones 342*a*, 344*a* (e.g., multipath peaks 342*c*, 344*c*) will not result in erroneous reads of RFID tags positioned in those locations because of the signal transmission synchronization between the first antenna 342 and the second antenna 344.

Specifically, each RFID tag may require any received signal to satisfy a certain minimum energy level 350 to adequately power the RFID tag to perform the decoding/execution/transmission functions described herein. The certain minimum energy level 350 may be −20 dBm and/or any suitable value. Moreover, when RFID tags simultaneously receive two or more signals with approximately the same energy levels (above the minimum energy level 350), the RFID tags are generally unable to determine which set of instructions to decode/execute, such that the RFID tags may not decode/execute any received set of instructions.

For example, when an RFID tag is located within the null zone 346, the RFID tag may simultaneously receive signals from the first antenna 342 and the second antenna 344, both of which, have sufficient energy to power the RFID tag. However, the energy ratio between the two signals will not exceed the energy ratio threshold 348 required for the RFID tag to determine which set of instructions to decode/execute. In other words, in the null zone 346, the signal transmitted by the first antenna 342 will not have an energy level greater than the energy ratio threshold 348 amount relative to the signal transmitted by the second antenna 344. In certain embodiments, the energy ratio threshold 348 may be approximately 4 dB, but it may be any suitable value.

For example, a signal transmitted by the first antenna 342 reaching an RFID tag in the null zone 346 may have an energy level of approximately 6 dB, and a signal transmitted by the second antenna 344 reaching the RFID tag in the null zone 346 may have an energy level of approximately 5 dB. In this example, the energy ratio between the first antenna 342 signal and the second antenna 344 signal is approximately 1 dB, and as a result, the RFID tag will be unable to determine whether to decode/execute the instructions included in the first antenna's 342 signal or the second antenna's 344 signal because the energy ratio is less than the approximately 4 dB energy ratio threshold 348.

The synchronization described herein also eliminates erroneous reads of RFID tags located near the antenna multipath peaks 342*c*, 344*c*. For example, an RFID tag may be located where the multipath peak 344*c* is strong enough to satisfy the minimum energy level 350. The RFID tag may then receive signals from the first antenna 342 and the second antenna 344 (e.g., a multipath peak), and the first antenna 342 signal may have an energy level of approximately 9 dB and the second antenna's 344 signal may have an energy level of approximately 3 dB. Accordingly, the RFID tag may determine that the first antenna's 342 signal should be decoded/executed because the energy ratio between the two signals is greater than the energy ratio threshold 348 (e.g., 4 dB), and the first antenna's 342 signal is stronger than the second antenna's 344 signal.

The prior example illustrates a general consequence of synchronization on signal transmissions into adjacent antenna read zones. The null zone 346 generally defines a region where the signal energy levels from the two antennas 342, 344 are similar enough that RFID tags will be unable to determine which instructions to decode/execute. Outside of the null zone 346, signals from adjacent/nearby antennas will lack sufficient energy to cause the RFID tag to decode/execute their instructions, thereby eliminating the risk of misreads due to scattered signals, multipath peak signals, and/or any other random signals received by an RFID tag that is not physically located proximate to the emitting antenna/reader.

Figure 4:
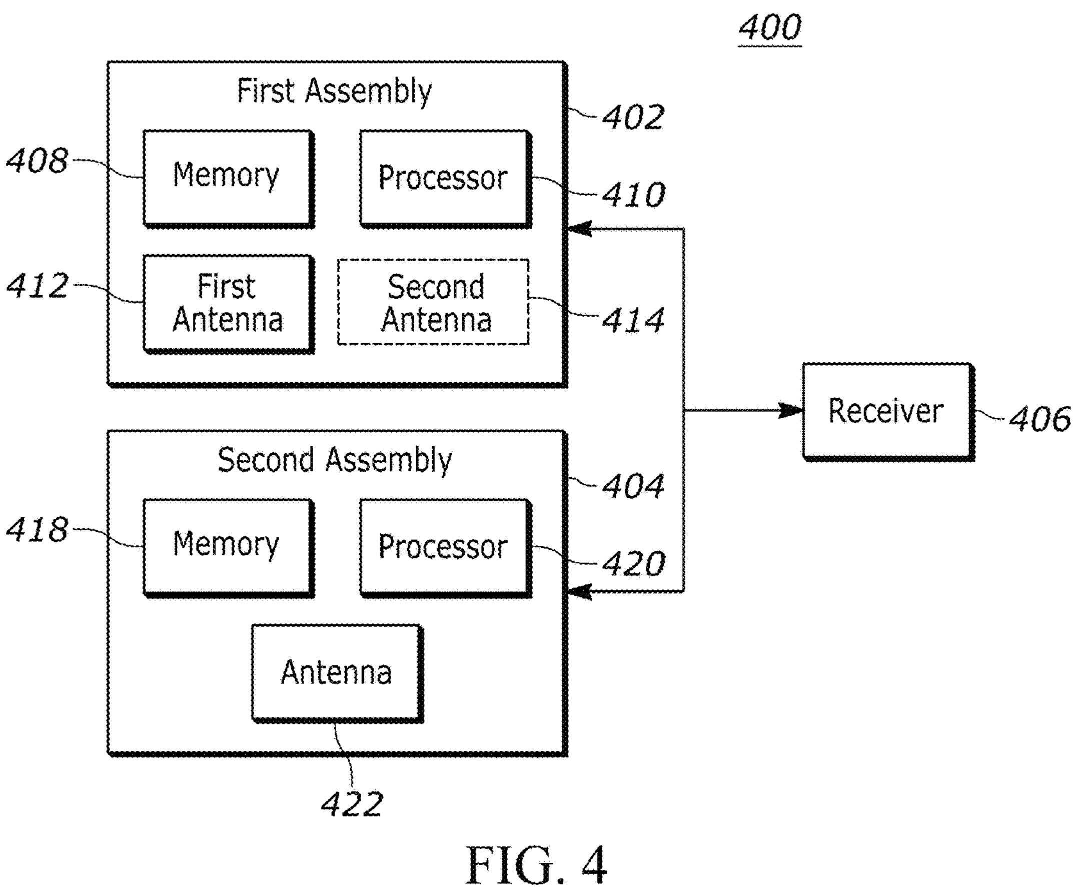
FIG. 4 is a block diagram of an example environment for implementing example methods and/or operations described herein.

FIG. 4 is a block diagram of an example environment 400 for implementing example methods and/or operations described herein, components of which may be configured to implement techniques for selectively limiting read zones, as described herein.

The environment 400 includes a first assembly 402 and a second assembly 404, which may each be at least a portion of an RFID reader, e.g., as described with respect to FIGS. 1-3B. The environment 400 also includes a receiver 406 configured to receive signals transmitted by the first assembly 402 and/or the second assembly 404 via communications represented by the arrow connecting the first assembly 402 and the second assembly 404 to the receiver 406. The receiver 406 may, for example, be an RFID tag including an antenna connected to an integrated circuit. In some aspects, the receiver 406 may be an RFID tag including still additional components, e.g., a battery and/or one or more sensors. Although only one receiver 406 is depicted in FIG. 4, the environment 400 may include two, three, four or more receivers 406 (e.g., multiple RFID tags in the environment 400).

The first assembly 402 includes a memory 408 (i.e., one or more memories, such as one or more non-transitory memories). The memory 408 stores instructions (e.g., set of synchronization instructions 102*b*1) that, when executed by a processor 410 (i.e., one or more processors), cause the first assembly 402 to perform actions attributed thereto (e.g., actions of one or more RFID readers described in this disclosure). For example, these actions of the first assembly 402 may include transmitting signals via the first antenna 412 and/or the second antenna 414 that are synchronized with signal transmissions from the second assembly 404 for accurately identifying/locating proximate tags within the first assembly's 402 read zone.

The first assembly 402 may further include any of the RFID reader circuitry and/or other components described with respect to FIGS. 1-3B. For example, the first assembly 402 includes a first antenna 412 and an optional second antenna 414, which may be in any suitable orientations and/or may transmit signals in any suitable polarizations. Transmission of signals between the first antenna 412 and/or the second antenna 414 and an antenna of the receiver 406 may correspond to RFID communications between the first assembly 402 and the receiver 406.

The second assembly 404 includes a memory 418 (i.e., one or more memories, such as one or more non-transitory memories). The memory 418 stores instructions (e.g., set of synchronization instructions 104*b*1) that, when executed by a processor 420 (i.e., one or more processors), cause the second assembly 404 to perform actions attributed thereto (e.g., actions of one or more RFID readers described in this disclosure). For example, these actions of the second assembly 404 may include transmitting signals via the antenna 422 that are synchronized with signal transmissions from the first assembly 402 to accurately identify/locate proximate tags within the second assembly's 404 read zone.

The second assembly 404 may further include any of the RFID reader circuitry and/or other components described with respect to FIGS. 1-3B. For example, the second assembly 404 includes an antenna 422, which may be in any suitable orientation and/or may transmit signals in any suitable polarization. Transmission of signals between the antenna 422 and an antenna of the receiver 406 may correspond to RFID communications between the second assembly 404 and the receiver 406.

The environment 400 may include additional and/or alternate components, in various possible aspects.

Figure 5:
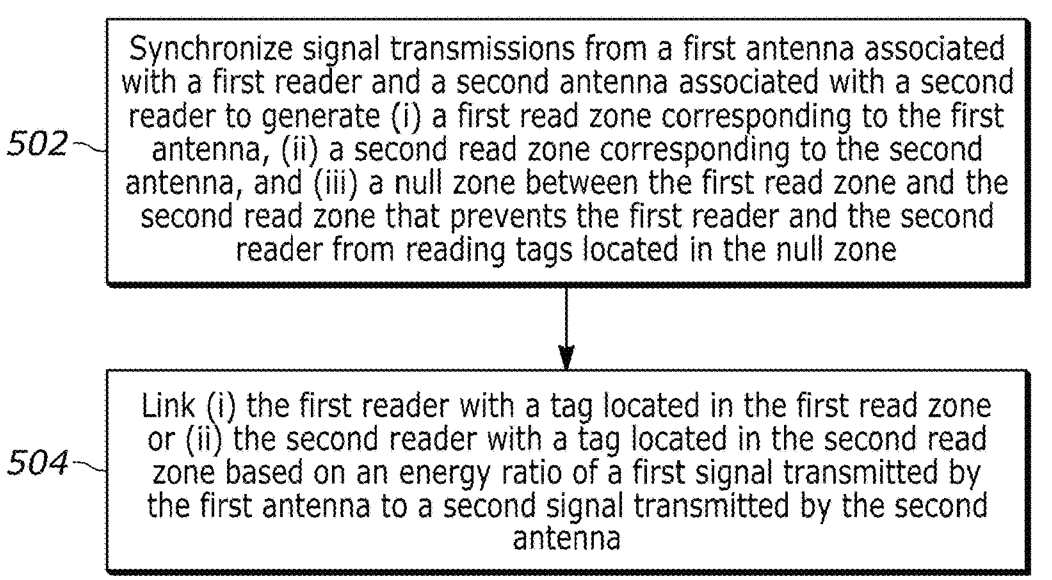
FIG. 5 is a flowchart representative of a method for selectively limiting read zones, in accordance with embodiments described herein.

FIG. 5 is a flowchart representative of a method 500 for selectively limiting read zones, in accordance with embodiments described herein. Generally, and as described herein, the method 500 for selectively limiting read zones may cause the server 110, the first reader 102, and/or the second reader 104 to synchronize signal transmissions and transmit the synchronized signals via one or more specifically configured/oriented antennas (e.g., antennas 102*a*1, 102*a*2, 104*a*) to proximate tags (e.g., tags 106*a*, 107*a*, 108*a*). It is to be understood that any of the steps of the method 500 may be performed by, for example, the server 110, the first reader 102, the second reader 104, the tags (e.g., tags 106*a*, 107*a*, 108*a*), and/or any other suitable components or combinations thereof discussed herein.

At block 502, the method 500 includes synchronizing signal transmissions from a first antenna associated with a first reader and a second antenna associated with a second reader to generate (i) a first read zone corresponding to the first antenna, (ii) a second read zone corresponding to the second antenna, and (iii) a null zone between the first read zone and the second read zone that prevents the first reader and the second reader from reading tags located in the null zone. The first antenna may be disposed at a first angle, and the second antenna may be disposed at a second angle different from the first angle. The method 500 further includes linking (i) the first reader with a tag located in the first read zone or (ii) the second reader with a tag located in the second read zone based on an energy ratio of a first signal transmitted by the first antenna to a second signal transmitted by the second antenna (block 504).

In some embodiments, the first antenna and the second antenna are disposed adjacent to a surface; and the second angle is greater than approximately 0° between the surface and a first plane that is orthogonal to the surface.

In certain embodiments, the second antenna is rotated relative to the first antenna in a second plane that is parallel to the surface.

In some embodiments, the first antenna is a narrow beamwidth antenna with a first angular coverage area; and the second antenna is a wide beamwidth antenna with a second angular coverage area different from the first angular coverage area.

In certain embodiments, the second read zone is bifurcated into two sub-zones.

In some embodiments, the first read zone is within a gap between a first surface and a second surface; a first sub-zone of the second read zone is adjacent to the first surface; and a second sub-zone of the second read zone is adjacent to the second surface.

In certain embodiments, the energy ratio of signals transmitted by the first antenna to signals transmitted by the second antenna and received by tags in the null zone is less than or equal to 4 dB.

In some embodiments, the first antenna and the second antenna are patch phased array antennas.

Of course, it is to be appreciated that the actions of the method 500 may be performed in any suitable order and any suitable number of times.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

What is claimed is:

1. A system comprising:

a first antenna associated with a first reader and disposed at a first angle;

a second antenna associated with a second reader and disposed at a second angle different from the first angle;

one or more processors; and one or more memories communicatively coupled to the first antenna, the second antenna, and the one or more processors storing instructions that, when executed by the one or more processors, cause the system to:

synchronize signal transmissions from the first antenna and signal transmissions from the second antenna to generate (i) a first read zone corresponding to the first antenna, (ii) a second read zone corresponding to the second antenna, and (iii) a null zone between the first read zone and the second read zone that prevents the first reader and the second reader from reading tags located in the null zone, and link (i) the first reader with a tag located in the first read zone or (ii) the second reader with a tag located in the second read zone, based on an energy ratio of a first signal transmitted by the first antenna to a second signal transmitted by the second antenna.

2. The system of claim 1, wherein:

the first antenna and the second antenna are disposed adjacent to a surface; and the second angle is greater than approximately 0° between the surface and a first plane that is orthogonal to the surface.

3. The system of claim 2, wherein the second antenna is rotated relative to the first antenna in a second plane that is parallel to the surface.

4. The system of claim 2, wherein:

the first antenna is a narrow beamwidth antenna with a first angular coverage area; and the second antenna is a wide beamwidth antenna with a second angular coverage area different from the first angular coverage area.

5. The system of claim 1, wherein the second read zone is bifurcated into two sub-zones.

6. The system of claim 5, wherein:

the first read zone is within a gap between a first surface and a second surface;

a first sub-zone of the second read zone is adjacent to the first surface; and a second sub-zone of the second read zone is adjacent to the second surface.

7. The system of claim 1, wherein the energy ratio of signals transmitted by the first antenna to signals transmitted by the second antenna and received by tags in the null zone is less than or equal to 4 decibels (dB).

8. The system of claim 1, wherein the first antenna and the second antenna are patch phased array antennas.

9. A method comprising:

synchronizing, by one or more processors, signal transmissions from a first antenna associated with a first reader and a second antenna associated with a second reader to generate (i) a first read zone corresponding to the first antenna, (ii) a second read zone corresponding to the second antenna, and (iii) a null zone between the first read zone and the second read zone that prevents the first reader and the second reader from reading tags located in the null zone, the first antenna being disposed at a first angle, and the second antenna being disposed at a second angle different from the first angle; and linking, by the one or more processors, (i) the first reader with a tag located in the first read zone or (ii) the second reader with a tag located in the second read zone based on an energy ratio of a first signal transmitted by the first antenna to a second signal transmitted by the second antenna.

10. The method of claim 9, wherein:

the first antenna and the second antenna are disposed adjacent to a surface; and the second angle is greater than approximately 0° between the surface and a first plane that is orthogonal to the surface.

11. The method of claim 10, wherein the second antenna is rotated relative to the first antenna in a second plane that is parallel to the surface.

12. The method of claim 10, wherein:

the first antenna is a narrow beamwidth antenna with a first angular coverage area; and the second antenna is a wide beamwidth antenna with a second angular coverage area different from the first angular coverage area.

13. The method of claim 9, wherein the second read zone is bifurcated into two sub-zones.

14. The method of claim 13, wherein:

the first read zone is within a gap between a first surface and a second surface;

a first sub-zone of the second read zone is adjacent to the first surface; and a second sub-zone of the second read zone is adjacent to the second surface.

15. The method of claim 9, wherein the energy ratio of signals transmitted by the first antenna to signals transmitted by the second antenna and received by tags in the null zone is less than or equal to 4 decibels (dB).

16. The method of claim 9, wherein the first antenna and the second antenna are patch phased array antennas.

17. A tangible non-transitory machine-readable medium comprising instructions that, when executed, cause a machine to at least:

synchronize signal transmissions from a first antenna associated with a first reader and a second antenna associated with a second reader to generate (i) a first read zone corresponding to the first antenna, (ii) a second read zone corresponding to the second antenna, and (iii) a null zone between the first read zone and the second read zone that prevents the first reader or the second reader from reading tags located in the null zone, the first antenna being disposed at a first angle, and the second antenna being disposed at a second angle different from the first angle; and link (i) the first reader with a tag located in the first read zone or (ii) the second reader with a tag located in the second read zone based on an energy ratio of a first signal transmitted by the first antenna to a second signal transmitted by the second antenna.

18. The tangible non-transitory machine-readable medium of claim 17, wherein:

the first antenna and the second antenna are disposed adjacent to a surface;

the second angle is greater than approximately 0° between the surface and a first plane that is orthogonal to the surface; and the second antenna is rotated relative to the first antenna in a second plane that is parallel to the surface.

19. The tangible non-transitory machine-readable medium of claim 18, wherein:

the first antenna is a narrow beamwidth antenna with a first angular coverage area; and the second antenna is a wide beamwidth antenna with a second angular coverage area different from the first angular coverage area.

20. The tangible non-transitory machine-readable medium of claim 17, wherein the energy ratio of signals transmitted by the first antenna to signals transmitted by the second antenna and received by tags in the null zone is less than or equal to 4 decibels (dB).

* * * * *